United States Patent [19]

Osakabe

[11] Patent Number: 5,581,771
[45] Date of Patent: Dec. 3, 1996

[54] MICROCOMPUTER HAVING INTERRUPT CONTROL CIRCUIT TO DETERMINE PRIORITY LEVEL

[75] Inventor: Takeshi Osakabe, Tokyo, Japan

[73] Assignee: NEC Corporation, Tokyo, Japan

[21] Appl. No.: 318,435

[22] Filed: Oct. 5, 1994

[30]     Foreign Application Priority Data

Oct. 8, 1993  [JP]  Japan ................... 5-253009

[51] Int. Cl.[6] .................... G06F 13/26; G06F 9/46
[52] U.S. Cl. .................... 395/738; 395/737; 395/293; 395/729
[58] Field of Search .................. 395/740, 775, 395/741, 739, 737, 738, 742, 733, 734, 856, 200.06, 868, 859, 860, 729, 293, 478, 303

[56]                References Cited

U.S. PATENT DOCUMENTS

| | | | |
|---|---|---|---|
| 3,836,889 | 9/1974 | Kotok et al. ................. | 395/737 |
| 3,909,790 | 9/1975 | Shapiro et al. .............. | 395/856 |
| 4,003,028 | 1/1977 | Bennett et al. .............. | 395/742 |
| 4,034,349 | 7/1977 | Monaco et al. ............... | 395/868 |
| 4,035,780 | 7/1977 | Kristick et al. ............. | 395/732 |
| 4,086,627 | 4/1978 | Bennett et al. .............. | 395/740 |
| 4,326,249 | 4/1982 | Godsey ...................... | 395/868 |
| 4,628,447 | 12/1986 | Cartret et al. ............. | 395/730 |
| 4,748,586 | 5/1988 | Bonci ....................... | 395/742 |
| 4,930,068 | 5/1990 | Katayose et al. ............. | 395/734 |
| 4,991,084 | 2/1991 | Rodiger et al. .............. | 395/311 |
| 5,077,662 | 12/1991 | Hutson ..................... | 395/737 |
| 5,083,261 | 1/1992 | Wilkie ..................... | 395/738 |
| 5,142,625 | 8/1992 | Nakai ...................... | 395/733 |
| 5,218,703 | 6/1993 | Fleck et al. ............... | 395/737 |
| 5,237,692 | 8/1993 | Raasch et al. .............. | 395/740 |
| 5,257,357 | 10/1993 | Yishay et al. ............. | 395/742 |
| 5,257,385 | 10/1993 | Roskowski et al. .......... | 395/738 |
| 5,282,272 | 1/1994 | Guy et al. ................. | 395/200.06 |
| 5,379,434 | 1/1995 | DiBrino .................... | 395/737 |
| 5,404,538 | 4/1995 | Krappweis, Sr. ............. | 395/737 |
| 5,410,710 | 4/1995 | Sarangdhar et al. .......... | 395/739 |
| 5,430,879 | 7/1995 | Murai ...................... | 395/741 |
| 5,469,571 | 11/1995 | Bunnell ................... | 395/700 |

*Primary Examiner*—Gopal C. Ray
*Attorney, Agent, or Firm*—Whitham, Curtis, Whitham & McGinn

[57]                ABSTRACT

A microcomputer includes a selector group, a priority control circuit and a CPU. The selector group selects an interrupt request signal from among interrupt request signals to be inputted thereto for every priority level in accordance with an input control data. The priority control circuit determines an interrupt request signal having the highest priority level from among the selected interrupt request signals for the priority levels and generating an interrupt signal. The CPU outputs the control data to the selector group and executes an interrupt processing corresponding to the interrupt request signal having the highest priority level.

20 Claims, 6 Drawing Sheets

MICROCOMPUTER HAVING INTERRUPT CONTROL CIRCUIT TO DETERMINE PRIORITY LEVEL

BACKGROUND OF THE INVENTION

1. Field of the Invention

The present invention relates to a microcomputer, and more particularly, to an interrupt control circuit of the microcomputer.

2. Description of Related Art

Figure 1:
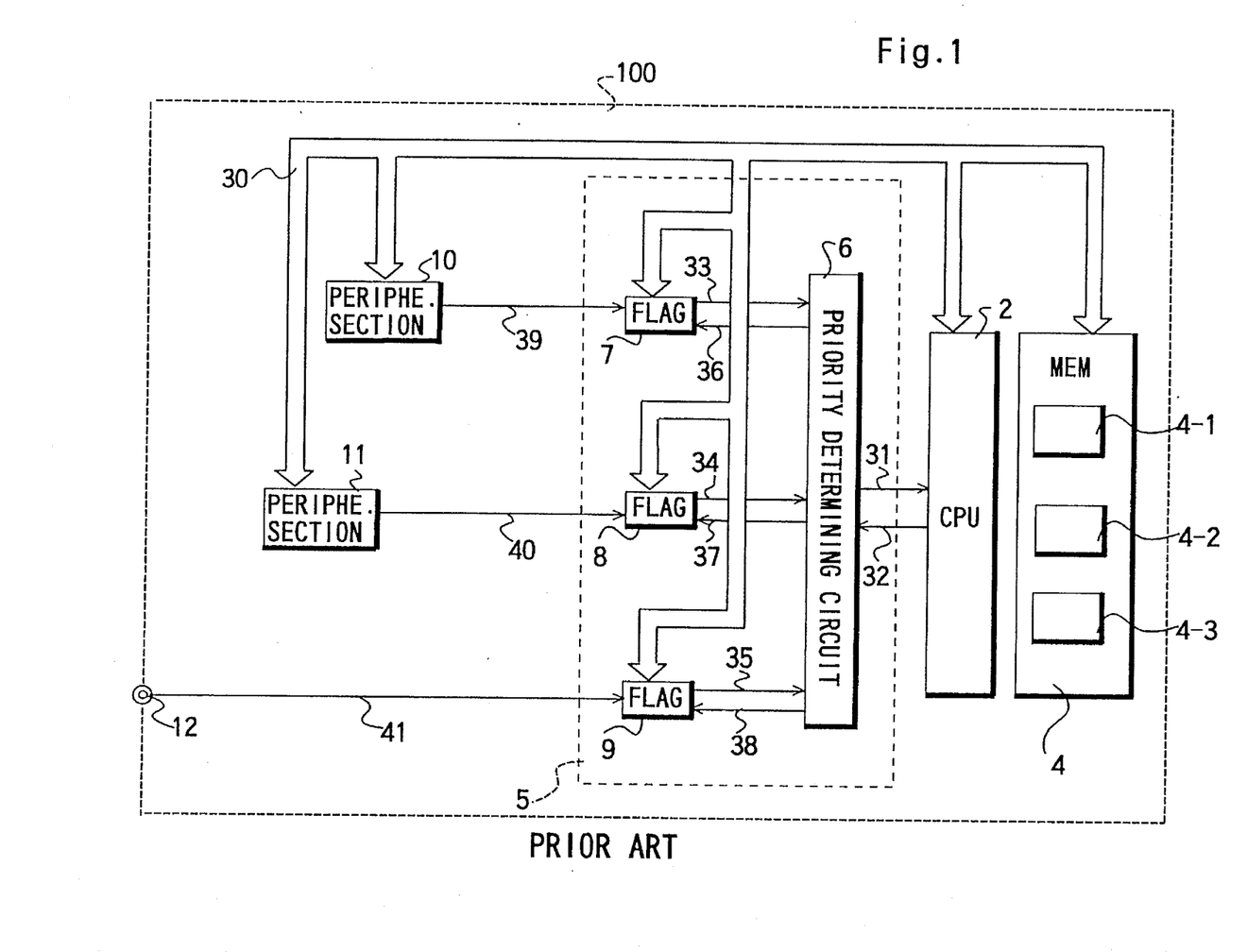
FIG. 1 is a diagram showing a conventional microcomputer.

In a conventional microcomputer, an interrupt request issuing unit or section is fixedly connected to a central processing unit (CPU) and hence there is no flexibility. An example of the conventional microcomputer 100 is shown in FIG. 1. The microcomputer 100 includes a central processing unit (CPU) 2, a memory 4 having tables 4-1 to 4-3, an interrupt control circuit 5, two peripheral sections 10 and 11 such as a timer and a serial interface, a terminal 12 for receiving an interrupt request from an external unit and a bus 30, for instance. The interrupt control circuit 5 includes a priority determining circuit 6 and three interrupt flag registers 7 to 9. The bus 30 connects between the CPU 2 and each of the memory 4, the interrupt flag registers 7 to 9, and the peripheral sections 10 and 11. The peripheral sections 10 and 11 and the terminal 12 are connected to the interrupt flag registers 7 to 9 via interrupt request lines 39, 40 and 41, respectively, and the interrupt flag registers 7 to 9 are connected to the priority determining circuit 6 via pairs of a flag state line and a flag clear line 33 and 36, 34 and 37, and 35 and 38. The priority determining circuit 6 is connected to the CPU 2 via an interrupt line 31 and an interrupt reception line 32 and selects and outputs to the CPU 2 an interrupt having the highest priority level from among a plurality of interrupts stored in the interrupt flag registers 7 to 9 when the interrupts conflicts with each other. The tables 4-1 to 4-3 in the memory 4 are respectively provided for the interrupt flag registers 7 to 9 and each of the tables stores a start address of a program (subroutine) to be executed by the CPU 2 when the interrupt stored in the corresponding interrupt flag register is selected.

The interrupt flag registers 7 to 9 are normally kept in the reset state of "0" and are set to "1" in response to the interrupt request signals-via the interrupt request lines 39 to 41, to inform the interrupts to the priority determining circuit 6 via the flag state lines 33 to 35, respectively. Each of the interrupt flag registers 7 to 9 has a vector address to read out a start address from the corresponding tables 4-1 to 4-3 in the memory 4. Also, the interrupt flag registers 7 to 9 are reset in response to the flag clear signal via the flag clear lines 36 to 38, respectively. Further, the interrupt flag registers 7 to 9 are allocated with predetermined priority levels, e.g., the priority levels are higher in order of the interrupt flag register 7, the interrupt flag register 8 and the interrupt flag register 9. The priority determining circuit 6 determines the interrupt request signal having the highest priority level from among currently issued interrupt request signals to output to the CPU 2 as the interrupt signal via the interrupt line 31 when two or more interrupt flag registers are set, and outputs the interrupt signal to the CPU 2 when the single interrupt flag register is set.

Next, an operation of the microcomputer 100 will be described below.

First, the case where a single interrupt request signal is issued will be described below taking as an example the interrupt request signal issued from the peripheral section 10. When the interrupt request signal via the interrupt request line 39 is set to the active state of "1" during a predetermined period of time by the peripheral section 10, the interrupt flag register 7 is set to "1", so that the flag state signal via the flag state line 33 of "1" is outputted to the priority determining circuit 6. The priority determining circuit 6 detects the flag state signal via the flag state line 33 of "1" to supply the interrupt signal via the interrupt line 31 of "1" to the CPU. In response to the interrupt request signal via the interrupt line 31 of "1", the CPU 2 issues the interrupt reception signal via the interrupt reception line 32 of "1" during a predetermined period of time to the priority determining circuit 6. At the same time the CPU 2 executes an interrupt reception program to read out the start address from the table 4-1 corresponding to the vector address of the flag register 7 and executes an interrupt processing program (not shown) in accordance with the start address. In response to the interrupt reception signal via the interrupt reception line 32, the priority determining circuit 6 resets the interrupt signal via the interrupt line 31 to "0" and holds the flag clear signal via the flag clear line 36 in the state of "0" during a predetermined period of time, so that the interrupt flag register 7 is reset to "0". As a result, the interrupt processing is completed.

Next, the case where two interrupt request signals are issued at a time will be described below, taking as an example the interrupt request signals supplied from the peripheral section 11 and the terminal 12. Assume that the interrupt request signal via the interrupt request line 41 and the terminal 12 at the same time when the interrupt request signal via the interrupt request line 40 is issued from the peripheral section 11. The interrupt flag registers 8 and 9 are set to "1" in response to the interrupt request signals via the interrupt lines 40 and 41, respectively, so that the flag state signals via the interrupt lines 34 and 35 are set to "1". The priority determining circuit 6 determines which of the flag state signals via the interrupt lines 34 and 35 has a higher priority level. As a result, the priority determining circuit 6 selects the flag state line 34 corresponding to the peripheral section 11 and issues the interrupt signal via the interrupt line 31 of "1" to the CPU based on the flag state signal via the flag state line 34. In this case the flag state signal via the flag state line 35 is kept in the state of "1", i.e., in the active state. The CPU 2 reads out a start address from the table 4-2 based on the vector address of the flag register 8 and executes an interrupt processing program (not shown) in accordance with the start address, as described above. The CPU 2 also issues the interrupt reception signal via the interrupt reception line 32 of "1" during the predetermined period of time to the priority determining circuit 6 in response to the interrupt signal via the interrupt line 31 of "1". In response to the interrupt reception signal via the interrupt line 32, the priority determining circuit 6 resets the interrupt signal via the interrupt line 31 to "0" and holds the flag clear signal via the flag clear line 37 in the state of "1" during the predetermined period of time, so that the interrupt flag register 8 is reset to "0". As a result, the interrupt processing is completed for the interrupt request signal via the interrupt request line 40. Because the flag state signal via the flag state line 35 is kept in the state of "1", the interrupt signal via the interrupt line 31 is issued from the priority determining circuit 6 to the CPU 2 based on the flag state signal via the flag state line 35 after the interrupt processing for the interrupt request signal via the interrupt request line 40 is completed. Then the similar operation is performed and the interrupt processing for the interrupt request signal via the interrupt request line 41 having a lower priority level is also completed.

However, in an application system in which such a microcomputer is utilized, all the peripheral sections built in the microcomputer are not always used. Ones of the peripheral sections necessary for the application are selected and used. Therefore, the hardware for interrupt processing of the peripheral sections unnecessary for the application is wasted. In addition, a user demands a microcomputer in which peripheral sections optimal to the application system are built. As a result, if a plurality of interrupts are necessary, it is demanded that the priority levels of the interrupts be optimized for the application system.

SUMMARY OF THE INVENTION

The present invention is made in light of the above circumstances.

The first aspect of the present invention is to provide a microcomputer in which the hardware for interrupt processing can be effectively used for an application.

The second aspect of the present invention is to provide a microcomputer in which necessary interrupt request signals can be selected from among a plurality of interrupt request signals which are possibly issued.

The third aspect of the present invention is to provide a microcomputer in which the interrupt request signals to be selected in the second aspect of the present invention can be selected programmably.

The fourth aspect of the present invention is to provide a microcomputer in which an interrupt request signal is selected from among a plurality of interrupt request signals based on the control data from an external unit or built-in peripheral section or the control data from a central processing unit.

A microcomputer according to the present invention includes a selector group, a priority control circuit and a CPU. The selector group selects one from among interrupt request signals to be inputted thereto for every priority level in accordance with an input control data. The priority control circuit determines an interrupt request signal having the highest priority level from among the selected interrupt request signals for the priority levels and generates an interrupt signal. The CPU outputs the control data to the selector group and executes an interrupt processing corresponding to the interrupt request signal having the highest priority level.

A microcomputer according to the present invention includes:

a CPU for generating a control data;

issuing units each for issuing an interrupt request signal; and a priority allocating unit for allocating a predetermined priority level to the interrupt request signal in accordance with the control data, wherein the CPU executes an interrupt processing based on the allocated priority level in response to the interrupt request signal.

As described above, according to the present invention, an interrupt request signal can be selected from among the interrupt request signals issued from the peripheral sections and supplied from the terminals. For instance, in a case where the number of interrupt request signals is 10, and the number of combinations is 10! (=3628800), the flexibility of the microcomputer is increased. In addition, because the control data can be changed while the main application program is executed, the flexibility is further increased.

DESCRIPTION OF THE PREFERRED EMBODIMENTS

The microcomputer of the present invention will be described below with reference to the accompanying drawings.

First, the microcomputer according to the first embodiment of the present invention will be described with reference to FIG. 2. The microcomputer 1-1 according to the first embodiment includes a central processing unit (CPU) 2, a memory 4 having tables 4-1 to 4-3, an interrupt control circuit 5, two peripheral sections 10 and 11 such as a timer and a serial interface, an external interrupt receiving terminal 12, registers 21 to 23, selectors 15 to 17 and a bus 30. The interrupt control circuit 5 includes a priority determining circuit 6 and three interrupt flag registers 7 to 9, as in the above conventional microcomputer 100. The bus 30 connects between the CPU 2 and each of the memory 4, the interrupt flag registers 7 to 9, the peripheral sections 10 and 11, and the registers 21 to 23. The memory 4 stores a main program, an interrupt control program, and three interrupt processing subroutines and includes the tables 4-1 to 4-3 each of which stores a start address of one interrupt processing subroutine. The CPU 2 executes the interrupt control program and the main program in the memory 4. The priority determining circuit 6 receives flag state signals via flag state lines 33 to 35 from the interrupt flag registers 7 to 9 and outputs an interrupt signal via an interrupt line 31 to the CPU 2. That is, the priority determining circuit 6 selects and outputs to the CPU 2 an interrupt request signal having the highest priority level from among a plurality of interrupt request signals currently stored in the interrupt flag registers 7 to 9 when the interrupt request signals conflict with each other. When receiving an interrupt reception signal via an interrupt reception line 32 from the CPU, the priority determining circuit 6 issues the flag clear signal via the flag clear line 36, 37 or 38 to the interrupt register 7, 8 or 9 corresponding to the selected interrupt request signal to reset the flag. The interrupt flag registers 7 to 9 receive selected interrupt request signals via the interrupt request lines 44 to 46 from the selectors 15 to 17 which are controlled by the registers 21 to 23, respectively. The interrupt flag registers 7 to 9 are normally kept in the reset state of "0" and are set to "1" in response to the selected interrupt request signals via the interrupt request lines 44 to 46, to inform the interrupts to the priority determining circuit 6 via the flag state lines 33 to 35, respectively. Also, the interrupt flag registers to 9 are reset in response to the flag clear signals via the flag clear lines 36 to 38, respectively. The registers 21 to 23 are provided for the selectors 15 to 17 and are of 2-bit data width. The CPU 2 stores 2-bit control data in each of the registers 21 to 23 upon execution of the interrupt control program at the initialization. Each of the selectors 15 to 17 has three input terminals and one output terminal in correspondence with the peripheral sections 10 and 11 and the terminal 12 and receives interrupt request signals via the interrupt request lines 39 to 41 from the peripheral sections 10 and 11 and the terminal 12. Each selector selects the interrupt request signal from the peripheral section 10 when the 2-bit control data stored in the registers 21, 22 and 23 is "00", from the peripheral section 11 when the 2-bit control data stored in the registers 21, 22 and 23 is "01", and from the terminal when the 2-bit control data stored in the registers 21, 22 and 23 is "10" or "11".

Next, an operation of the microcomputer 1-1 will be described below. In this embodiment, the higher priority levels are allocated to the interrupt flag registers 7 to 9 in the order of them. The case where the highest priority level is to be allocated to the peripheral section 11 will be described below.

The CPU 2 executes the interrupt control program at initialization to set 2-bit control data to each of the registers 21 to 23. The 2-bit control data is determined and set based on the user presetting of what priority levels the peripheral sections 10 and 11 and the terminal 12 are allocated with. The 2-bit control data of "01", "00", and "10" are respectively set in the registers 21 to 23 in this embodiment. When the peripheral section 11 requests an interrupt, the interrupt request signal via the interrupt request line 40 is set to the active state of "1" during a predetermined period of time by the peripheral section 11. Because the control data of "01" is stored in the register 21, the interrupt request signal from the peripheral section 11 is selected by the selector 15 to be supplied to the interrupt flag register 7. The interrupt flag register 7 is set to "1" in response to the selected interrupt request signal, so that the flag state signal via the flag state line 33 of "1" is outputted to the priority determining circuit 6 from the interrupt flag register 7. The priority determining circuit 6 detects the flag state signal via the flag state line 33 of "1" to supply the interrupt signal via the interrupt line 31 of "1" to the CPU. In response to the interrupt signal of "1", the CPU 2 issues the interrupt reception signal via the interrupt reception line 32 of "1" during a predetermined period of time to the priority determining circuit 6. Also, the CPU 2 suspends the execution of the main program to execute the interrupt control program and reads out the start address from the table 4-1 corresponding to a vector address of the interrupt flag register 7 to execute an interrupt processing subroutine (not shown) in accordance with the start address. In response to the interrupt reception signal via the interrupt reception line 32, the priority determining circuit 6 resets the interrupt request signal via the interrupt request line 31 to "0" and holds the flag clear signal via the flag clear line 36 in the state of "0" during a predetermined period of time, so that the interrupt flag register 7 is reset to "0". As a result, the interrupt processing is completed.

When two interrupt request signals are issued at a time, each interrupt request signal is selected by one selector determined in accordance with the 2-bit control data stored in the corresponding register by the CPU 2 and supplied to the corresponding interrupt flag as the selected interrupt request signal. The subsequent operation is the same as that in the conventional microcomputer 100 and therefore the description is omitted.

As described above, according to the first embodiment of the present invention, the priority level of each of the peripheral sections 10 and 11 and the terminal 12 can be programmably set by the user through the CPU 2 based on the designation from the user. That is, if the control data stored in the register 21 is "00", the interrupt flag register 7 is set to "1" in response to the interrupt request signal via the interrupt request line 39 from the peripheral section 10. If the control data stored in the register 21 is "01", the interrupt flag register 7 is set to "1" in response to the interrupt request signal via the interrupt request line 40 from the peripheral section 11. If the control data stored in the register 21 is "10" or "11", the interrupt flag register 7 is set in response to the interrupt request signal via the interrupt request line 41 from the terminal 12. In this manner, which of the interrupt request signals from the peripheral sections 10 and 11 and the terminal 12 is to have the highest priority level can be programmably and arbitrarily set. In the above description the control data is set at initialization upon execution of the interrupt control program by the CPU 2. However, the CPU 2 may write the new control data in the registers 21 to 23 while executing the main program. As a result, the priority level of each interrupt request signal can be freely and flexibly set. The switching operation of the interrupt request signals via the interrupt request lines 39 to 41 to the interrupt flag registers 7 to 9 is performed by a switching circuit composed of the registers 21 to 23 and the selectors 15 to 17 in the embodiment. However, it should be noted that the switching circuit may be constituted of a programmable logic device (PLD).

Figure 3:
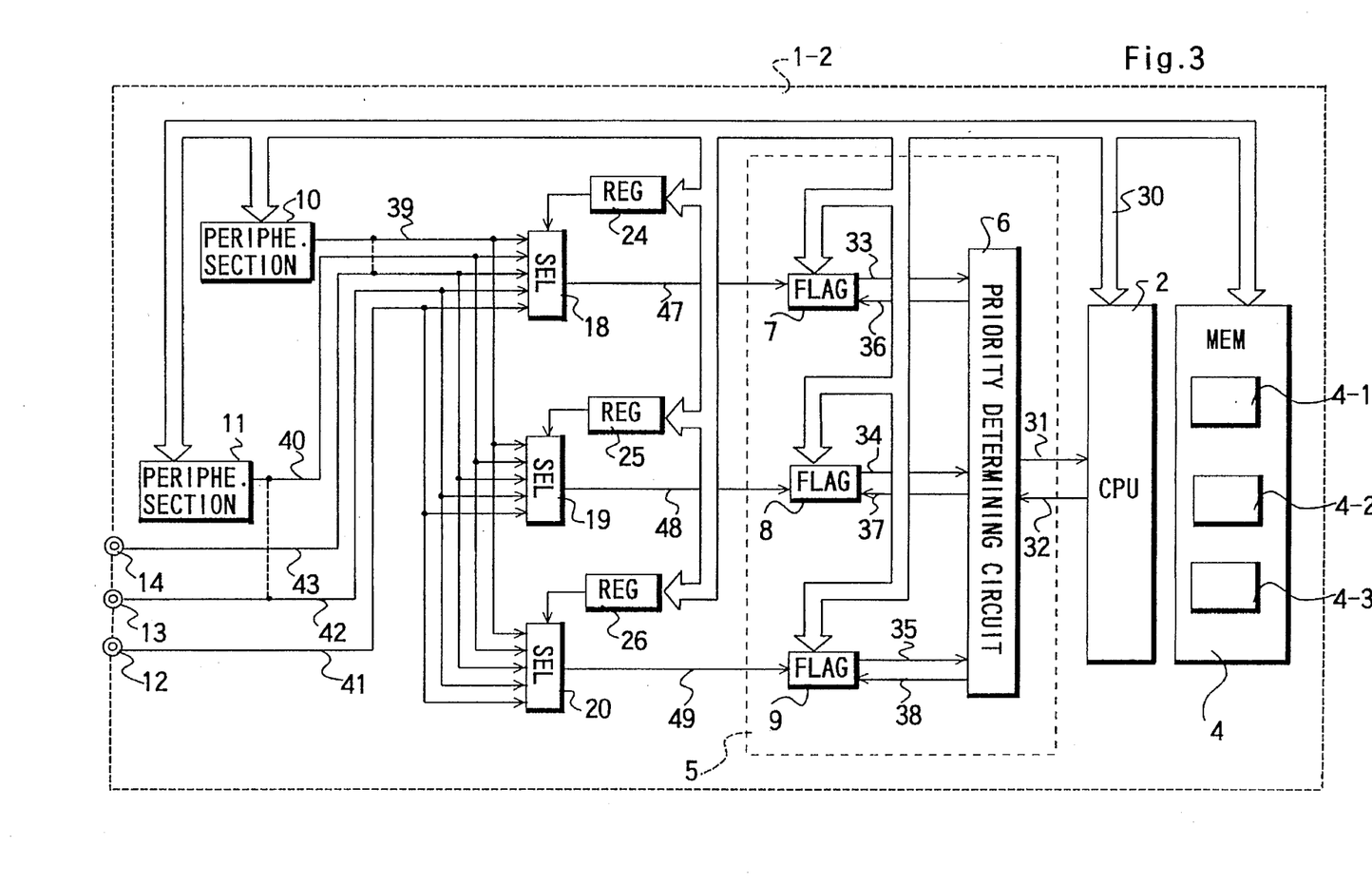
FIG. 3 is a diagram showing a microcomputer according to the second embodiment of the present invention.

Next, the microcomputer 1-2 according to the second embodiment of the present invention will be described below with reference to FIG. 3. The microcomputer 1-2 of the second embodiment is similar to that of the first embodiment. Therefore, only the different points will be described. In the above first embodiment, the number of issuing sources as peripheral sections of the interrupt request signals is equal to that of interrupt flag registers and is 3. However, in the second embodiment, the number of issuing sources is greater than that of an interrupt flags.

Figure 2:
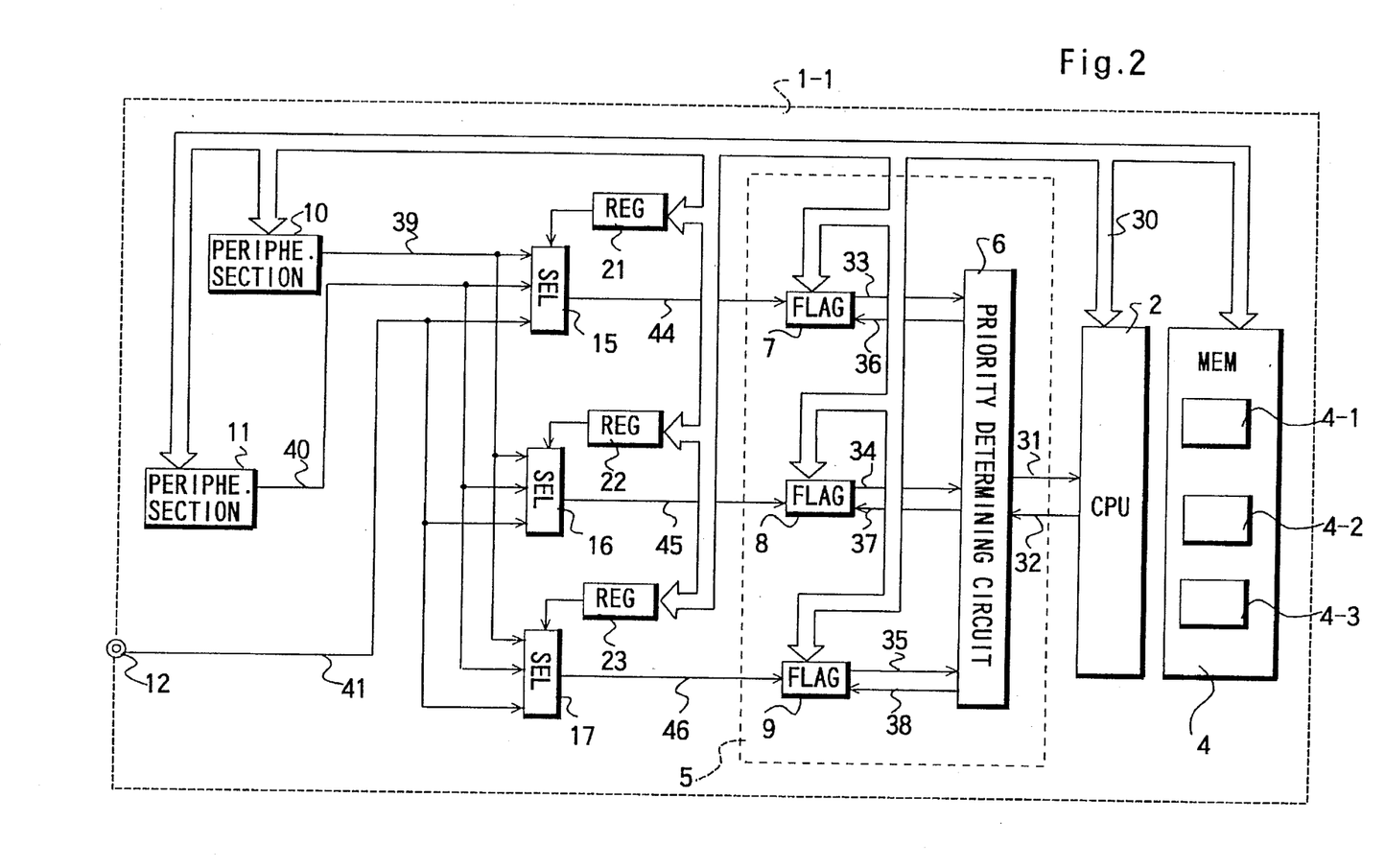
FIG. 2 is a diagram showing a microcomputer according to the first embodiment of the present invention.

In the microcomputer 1-2, terminals 13 and 14 are added to the system configuration shown in FIG. 2 for receiving interrupt request signals from the external circuit. Registers 24 to 26 are used instead of the registers 21 to 23 shown in FIG. 2 and are of 3-bit data width. The data width of the register is determined based on the number of interrupt request signals to be received. Selectors 18 to 20 are used instead of the selectors 15 to 17 shown in FIG. 2. Each of the selectors 18 to 20 is of 5-input terminals and 1-output terminal type and receives interrupt request signals from the terminals 13 and 14 in addition to those from the peripheral sections 10 and 11 and the terminal 12.

The 3-bit control data are stored in the registers 24 to 26 by the CPU 2 when the CPU 2 first executes the interrupt control program. Each selector is supplied with the interrupt request signals via the interrupt request lines 39 to 43 from the peripheral sections 10 and 11 and the terminals 12 to 14 and selects an interrupt request signal from among the interrupt request signals based on the 3-bit control data stored in the corresponding register. The selected interrupt request signal is supplied to the interrupt flag register corresponding to the selector, so that the flag is set in the interrupt flag register. In this case, if the control data stored in the register is "000", "001", "010", "011", or "100", "101", "110" or "111", the selector selects in accordance with the control data stored in a corresponding register, the interrupt request signal from the peripheral section 10, the peripheral section 11, the terminal 12, the terminal 13 or the terminal 14 is selected. The selected interrupt request signals via the interrupt request lines 47 to 49 are supplied from the selectors 18 to 20 to the interrupt flag registers 7 to 9, respectively. The subsequent operation is the same as in the first embodiment.

In this manner, in the microcomputer 1-2 of the second embodiment, the priority levels of the interrupt request signals from the peripheral sections 10 and 11 and the terminals 12 to 14 can be determined based on the control data stored in the registers 24 to 26. Therefore, by changing the control data to be stored in the registers 24 to 26, the priority levels can be freely set, as in the first embodiment.

In this embodiment, it is described that the terminals 13 and 14 are only for receiving the interrupt request signals from outside the microcomputer. However, the number of input terminals of the selector needs not to be increased if lines for the interrupt request signals from the terminals 13 and 14 are commonly used to lines for the interrupt request signals from the peripheral sections 11 and 10, respectively, as shown in FIG. 3 by dashed lines. In this case, if the peripheral section 10 is not used, the line connected to the peripheral section 10 can be used for the interrupt request signal inputted from outside the microcomputer via the terminal 14. In this manner, the hardware an for interrupt can be effectively used and the user can achieve the optimal interrupt system to an application.

Figure 4:
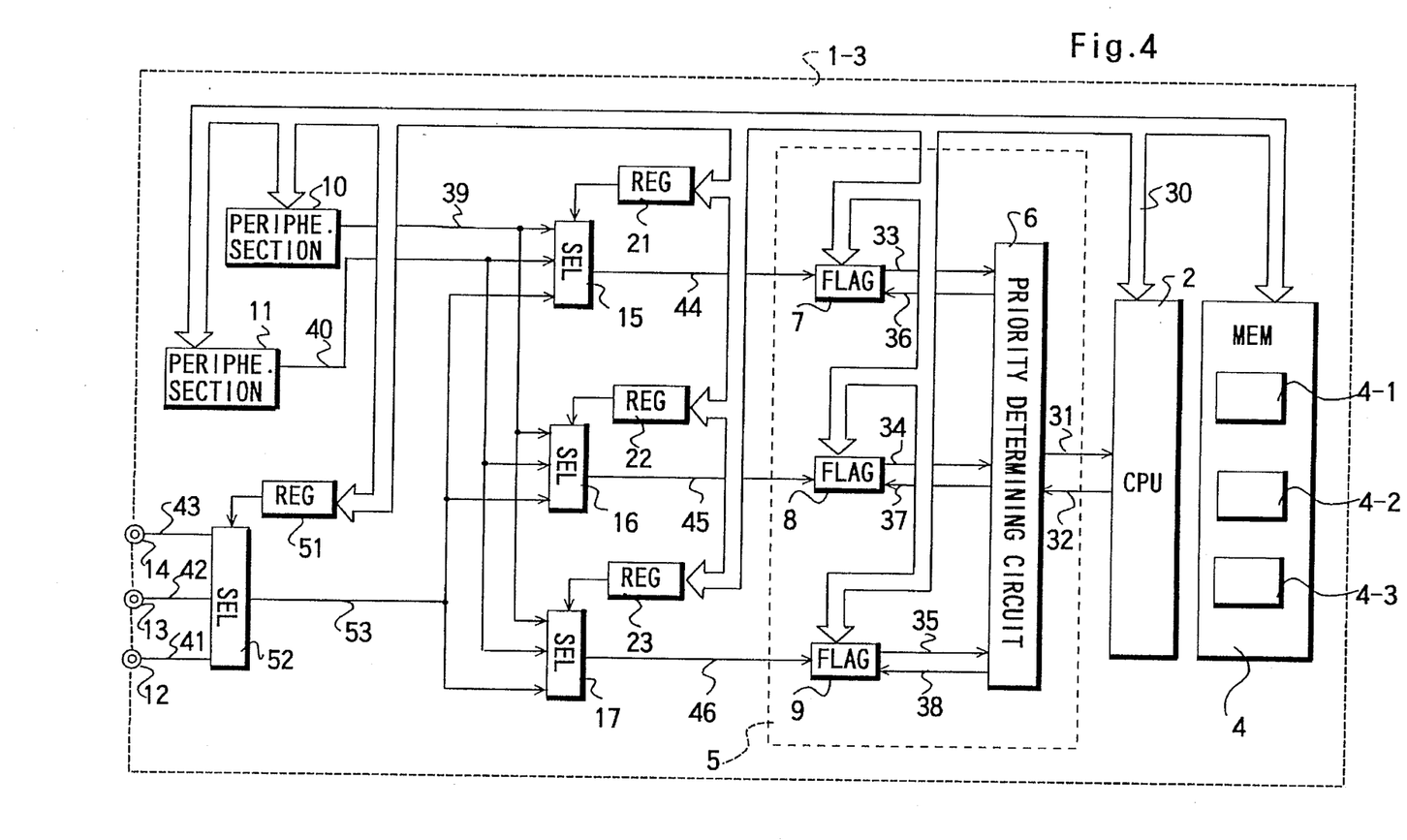
FIG. 4 is a diagram showing a microcomputer according to the third embodiment of the present invention.

Next, the microcomputer 1-3 according to the third embodiment of the present invention will be described below with reference to FIG. 4. The microcomputer 1-3 is similar to the first embodiment. Therefore, only the different points will be described and the other description is omitted.

In the microcomputer 1-3, terminals 13 and 14, a register 51 and a selector 52 are added to the configuration shown in FIG. 2. The register 51 is of 2-bit data width and connected to the bus 30. The 2-bit control data is stored in the register 51 by CPU 2 at the initialization while the CPU 2 executes the interrupt control program and is changed by the CPU 2 while the CPU 2 executes the main program. The selector 52 receives the interrupt request signals via the interrupt request lines 41 to 43 from the terminals 12 to 14 and selects one from among the interrupt request signals via the interrupt request lines 41 to 43 to supply to the selectors 15 to 17 as the interrupt request signal via the interrupt request line 53.

The operation of the microcomputer 1-3 will be described below. The control data is set in the register 51 as well as the registers 21 to 23 by CPU 2 at the initialization upon execution of an interrupt control program, so that one of the three interrupt request signals via the interrupt request lines 41 to 43 is selected, e.g., the interrupt request signal via the interrupt request line 41 is selected. The selected signal is supplied to the selectors 15 to 17 as the interrupt request signal via the interrupt request line 53. The subsequent operation is the same as in the first embodiment. While the CPU 2 executes the main program, the CPU 2 rewrites the control data in accordance with processing to be executed based on the main program. For instance, the interrupt request signal via the interrupt request line 42 is selected to be supplied to the selectors 15 to 17. In this case, if the control data for the register 21 is also rewritten such that the interrupt request signal via the interrupt request line 53 can be selected, the interrupt request signal via the interrupt request line 53 is allocated with the highest priority level and is processed by the CPU 2. The subsequent operation is the same as in the first embodiment.

The interrupt request signal from outside the microcomputer is normally inputted based on the processing of the main program executed by the CPU 2. Therefore, all the interrupt request signals via the interrupt lines 41 to 43 are not always used. According to the configuration of the third embodiment, the interrupt request signal can be inputted and processed if it is necessary. However, if it is not necessary, the interrupt request signal can be selected. In this manner, the number of registers can be held to a minimum and the number of input terminals of each selector can be also held to a minimum, without degrading the interrupt processing.

Figure 5:
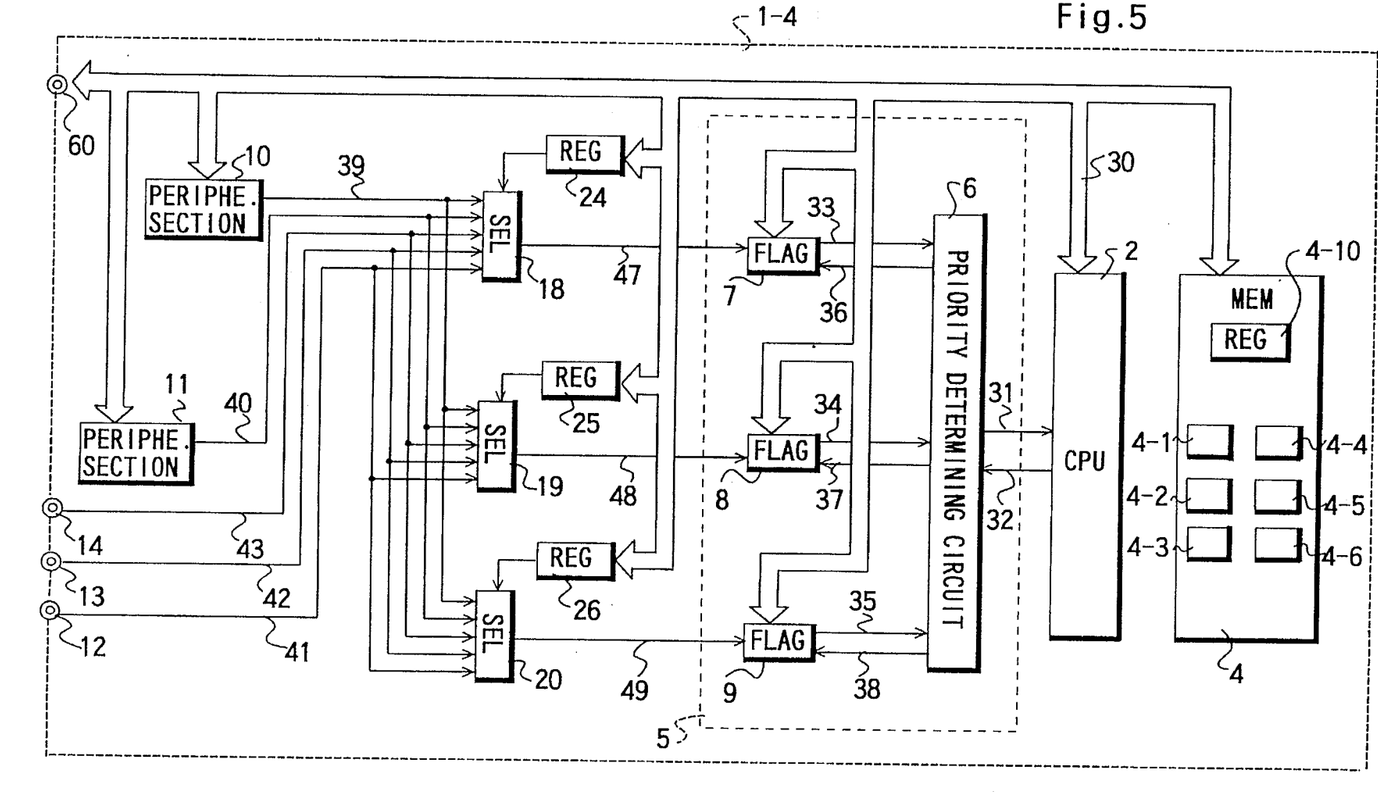
FIG. 5 is a diagram showing a microcomputer according to the fourth embodiment of the present invention.
Figure 6:
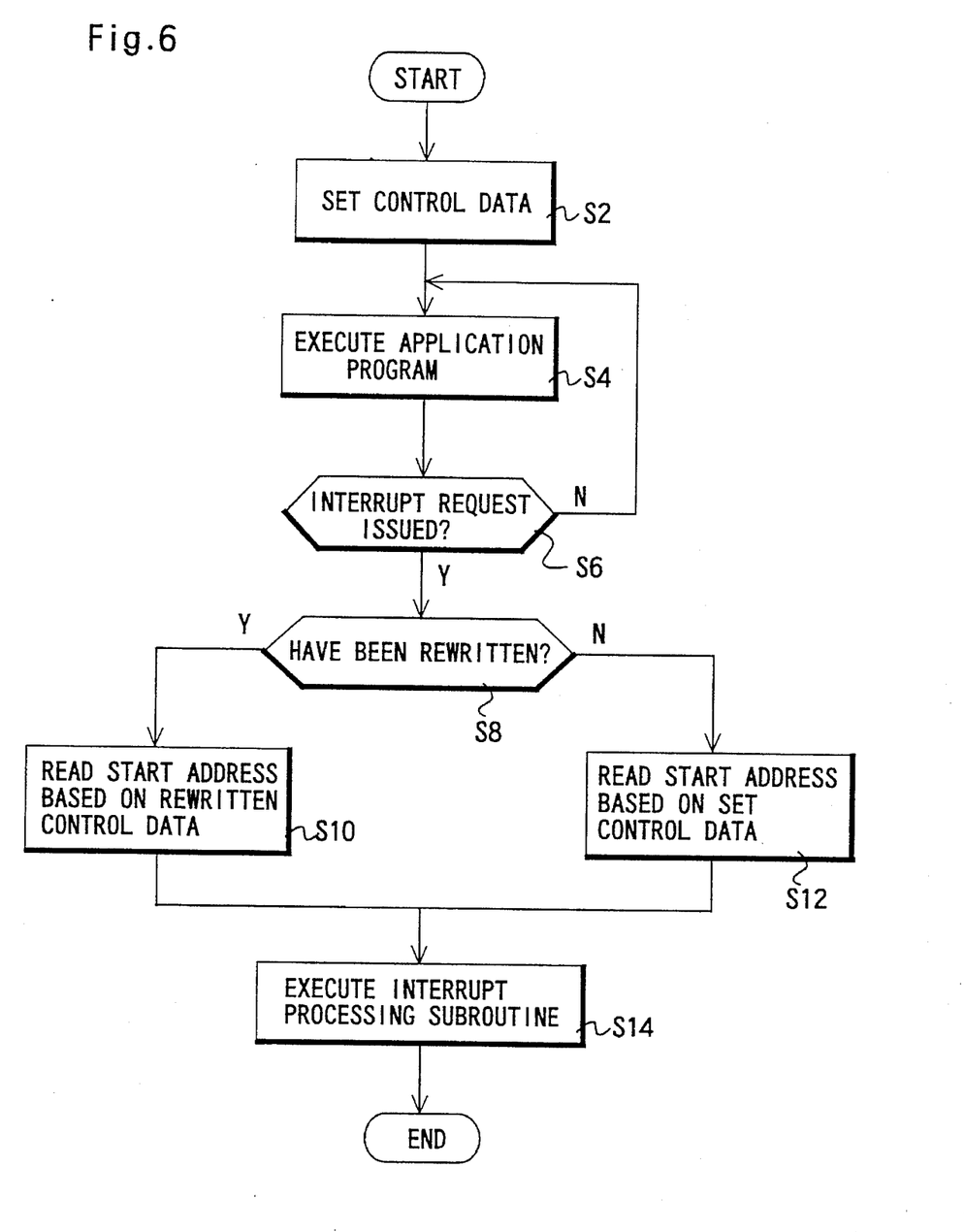
FIG. 6 is a flow chart showing the operation of the microcomputer shown in FIG. 5.

Next, a microcomputer 1-4 according to the fourth embodiment of the present invention will be described below with reference to FIGS. 5 and 6. In FIG. 5, the microcomputer 1-4 of the fourth embodiment is similar to that of the second embodiment. Therefore, only the different points will be described and the same will be omitted in the following description.

In the microcomputer 1-4 of the fourth embodiment, in addition to the peripheral sections 10 and 11, the registers 24 to 26, the interrupt flag registers 7 to 9, the CPU 2, and the memory 4, the bus 30 is connected to a terminal 60 which is connected to an external unit (not shown) which is in turn connected to the terminal 12. The memory 4 includes a register 4-10 and a set of three tables for every interrupt request signal via the interrupt request line 39, 40, 41, 42 or 43, i.e., a set of tables 4-1 to 4-3 and a set of tables 4-4 to 4-6. The tables 4-1 and 4-4 correspond to the vector address of the interrupt flag register 7, the table 4-2 and 4-5 corresponding to the vector address of the interrupt flag register 8, and the tables 4-3 and 4-6 corresponding to the vector address of the interrupt flag register 9. One of these sets of three tables is selected based on the content of the register 4-10. That is, one table can be designated based on the selection by the priority determining circuit 6 and the content of the register 4-10. The external unit connected to the terminal 60 can rewrite the control data for the register 24, 25, 26 and 4-11.

Next, the operation of the microcomputer 1-4 according to the fourth embodiment will be described below with reference to FIG. 6. In a step S2 the CPU executes an interrupt control program for initialization to set the control data in the registers 24 to 26 and 4-10. Assume that the control data is set such that the interrupt request signal via the interrupt request line 39 issued from the peripheral section 10 is selected by the selector 18, that the interrupt request signal via the interrupt request line 40 issued from the peripheral section 11 is selected by the selector 19, and that the interrupt request signal via the interrupt request line 41 supplied from the terminal 12 is selected by the selector 20. Also, assume that the control data is set in the register 4-10 such that the set of tables 4-1 to 4-3 is selected. Subsequently, the CPU 2 executes a main application program in a step S4. While executing the main program, the CPU 2 checks in a step S6 whether or not the interrupt signal via the interrupt line 31 is issued. If the interrupt signal via the interrupt line 31 is not issued the main application program is executed. If the interrupt signal via the interrupt line 31 is issued, the CPU 2 starts to execute the interrupt control program to perform the interrupt processing in a step S8 and subsequent steps.

When an interrupt request signal corresponding to the interrupt signal via the interrupt line 31 is issued from the peripheral section 10 without rewriting the control data, it is determined in the step S8 that the control data is not rewritten and subsequently the step S12 is performed to read out a start address from the table 4-1. Based on the read out start address the CPU 2 starts the interrupt processing to execute an interrupt processing subroutine.

The interrupt request signal from the external unit connected to the terminal 12 is normally selected by the selector 20 to have the lowest priority level. However, when the interrupt request signal having the highest priority level needs to be issued from the external unit connected to the terminal 12, the external unit produces a control data to rewrite the contents of the registers 24 and 4-10 such that the interrupt request signal from the external unit is selected by the selector 18 and that the set of tables 4-4 to 4-6 are selected. As a result, it is determined in the step S8 that the control data is rewritten. The CPU 2 reads out a start address from the table 4-4 with reference to the content of the register 4-10 and the vector address of the flag register 7 in the step S10. Then, based on the start address the CPU 2 starts the interrupt processing to execute an interrupt processing subroutine.

After the execution of interrupt processing subroutine, the CPU 2 executes the interrupt control program to reset the control data to be stored in the registers 24 to 26 and 4-10. It should be noted that the detailed description of operation after the interrupt request signal is selected by the selector is the same as in the second embodiment and hence is omitted.

According to the microcomputer 1-4 of the fourth embodiment, the interrupt request signals from the peripheral sections and the terminals can be programmably allocated with the priority levels in accordance with the designation from the user and the control data may be rewritten by the CPU 2 while the main application program is executed by the CPU 2. Further, if necessary, the control data can be rewritten by the external unit via a terminal 60 connected to the bus 30. Therefore, when the state necessary for the interrupt processing is caused in the external unit, the interrupt processing can be performed in accordance with the priority level of the state. In this manner, in the fourth embodiment, the interrupt processing can be performed flexibly with various priority levels in addition to effective use of the hardware for the interrupt processing.

In addition, in the above embodiment, only one external unit connected to the terminal 60 is connected to the bus 30. However, a plurality of external units may be connected to the bus 30 to modify the control data.

Further, in the above embodiment there are provided two sets of tables. However, there may be provided one set of tables for each of the peripheral sections and terminals. In this case, one table may be designated from the set of tables which is designated by the control data in the register 4-10, in accordance with the priority level. Another method may be applied.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any modifications or embodiments as fall within the true scope of the invention.

What is claimed is:

1. A microcomputer comprising:
   a plurality of interrupt request signal issuing circuits for issuing interrupt request signals;
   a selecting circuit for selecting a request signal from among said interrupt request signals having every priority level in accordance with a control data;
   a priority control circuit for determining a request signal having the highest priority level from among the selected interrupt request signals for the priority levels and generating an interrupt signal;
   a central processing unit for outputting said control data to said selecting circuit, and for executing an interrupt processing corresponding to said interrupt request signal from said priority control circuit; and
   an internal bus connecting said central processing unit to said priority control circuit and said selecting circuit,
   wherein said selecting circuit comprises a plurality of selectors, each of which receives all the interrupt request signals and selects one from among the interrupt request signals in accordance with a select signal inputted thereto.

2. A microcomputer according to claim 1, wherein said selecting circuit further comprises:
   a plurality of registers for receiving said control data via said internal bus from said central processing unit to respectively issue select signals to said plurality of selectors based on said control data.

3. A microcomputer according to claim 2, wherein said registers are provided for corresponding to said selectors.

4. A microcomputer according to claim 2, wherein said central processing unit supplies different said control data to each of said registers in said selecting circuit to determine a register having the highest priority level from among the interrupt request signals while said central processing unit executes an application program.

5. A microcomputer according to claim 4, wherein said registers are provided for corresponding to said selectors, respectively.

6. A microcomputer according to claim 1, wherein the priority level of each of said plurality of interrupt request signal issuing circuits and an external terminal are programmably set by a user through the central processing unit based on said control data.

7. A microcomputer according to claim 1, wherein said central processing unit writes control data subsequent to said control data into said selecting circuit while executing a main program.

8. A microcomputer comprising:
   a selecting circuit for selecting an interrupt request signal from among a plurality of interrupt request signals to be inputted thereto for every priority level in accordance with a control data;
   an issuing circuit including a plurality of units, for issuing said plurality of interrupt request signals and for generating said control data, said control data being associated with priority levels selectively assigned to said plurality of units;
   a priority control circuit for determining an interrupt request signal having the highest priority level from among the selected interrupt request signals for the priority levels and for generating an interrupt signal; and
   a central processing unit for outputting the control data to said selecting circuit, and for executing an interrupt processing corresponding to the interrupt request signal having the highest priority level,
   wherein said selecting circuit comprises a plurality of selectors, each of which is provided for one priority level and selects one from among the interrupt request signals to be inputted thereto in response to a select signal inputted thereto.

9. A microcomputer according to claim 8, wherein said central processing unit executes the interrupt processing for a priority level determined by said priority control circuit in accordance with the control data.

10. A microcomputer according to claim 8, wherein said selecting circuit further comprises:

a plurality of registers each of which is provided for one priority level, for receiving the control data from said central processing unit to respectively issue said select signals to said plurality of selectors.

11. A microcomputer according to claim 8, wherein said central processing unit includes means for outputting different control data to said selecting circuit while executing a main program.

12. A microcomputer according to claim 8, wherein said selecting circuit further comprises:

a plurality of registers each of which is provided for one priority level, for receiving the control data from said central processing unit to respectively issue said select signals to said plurality of selectors, wherein said central processing unit executes the interrupt processing for a priority level determined by said priority control circuit in accordance with the control data, and wherein said central processing unit includes means for outputting different control data to said selecting circuit while executing a main program.

13. A microcomputer comprising:

a first selecting circuit for selecting an interrupt request signal from among interrupt request signals externally issued;

a second selecting circuit for selecting an interrupt request signal from among interrupt request signals internally issued and the selected interrupt request signal by said first selecting circuit in accordance with input control data for every priority level, said input control data being associated with priority levels selectively assigned to a source of said interrupt request signals externally issued and a source of said interrupt request signals internally issued;

a priority control circuit for determining an interrupt request signal having the highest priority level from among the selected interrupt request signals for the priority levels by said second selecting circuit and for generating an interrupt signal; and a central processing unit for outputting the control data to said selecting circuit, for executing an interrupt processing corresponding to the interrupt request signal having the highest priority level, wherein each of said first and second selecting circuits comprises:

a plurality of selectors, each of which is provided for one priority level and selects an interrupt request signal from among the interrupt request signals to be inputted thereto in response to a select signal inputted thereto.

14. A microcomputer according to claim 13, wherein each of said first and second selecting circuits further comprises:

a plurality of registers each provided for one priority level, for receiving the control data from said central processing unit to respectively issue the select signals to said plurality of selectors.

15. A microcomputer according to claim 13, wherein the number of interrupt request signals are greater than the number of priority levels.

16. A microcomputer according to claim 13, wherein said central processing unit includes means for outputting different control data to said selecting circuit while executing a main program.

17. A microcomputer according to claim 13, wherein at least one of the plurality of interrupt request signals is issued from one of an external unit and an internal unit using the same line.

18. A microcomputer according to claim 13, wherein each of said first and second selecting circuits further comprises:

a plurality of registers each of which is provided for one priority level, for receiving the control data from said central processing unit to respectively issue the select signals to said plurality of selectors, wherein the number of interrupt request signals are greater than the number of priority levels.

19. A microcomputer according to claim 18, wherein said central processing unit includes means for outputting control data to said selecting circuit while executing a main program.

20. A microcomputer according to claim 19, wherein at least one of the plurality of interrupt request signals is issued from one of an external unit and an internal unit using the same line.

* * * * *